United States Patent [19]

Fetsch

[11] Patent Number: 4,684,086
[45] Date of Patent: Aug. 4, 1987

[54] PIPE SADDLE

[75] Inventor: Rudolf Fetsch, St. Ingbert, Fed. Rep. of Germany

[73] Assignee: Unima Maschinenbau GmbH, Sulzbach-Neuweiler, Fed. Rep. of Germany

[21] Appl. No.: 850,559

[22] Filed: Apr. 11, 1986

[51] Int. Cl.⁴ .............................................. F16L 3/22
[52] U.S. Cl. .................................................. 248/68.1
[58] Field of Search .................. 248/68.1, 69, 74.4, 248/73, 65, 74.5, 67.5; 174/157; 403/391

[56] References Cited

U.S. PATENT DOCUMENTS

| | | | |
|---|---|---|---|
| 3,582,029 | 6/1971 | Moesta | 248/68.1 |
| 3,592,427 | 7/1971 | Misuraca | 248/68.1 |
| 3,856,244 | 12/1974 | Menshen | 248/68.1 X |
| 3,931,946 | 1/1976 | Soltysik | 248/68.1 |
| 3,968,323 | 7/1976 | Blanchet | 248/68.1 X |
| 3,982,304 | 9/1976 | Menshen | 248/68.1 |
| 4,118,838 | 10/1978 | Schiefer et al. | 248/68.1 |
| 4,273,465 | 6/1981 | Schoen | 248/67.5 X |

Primary Examiner—Ramon O. Ramirez
Attorney, Agent, or Firm—Roylance, Abrams, Berdo & Goodman

[57] ABSTRACT

A pipe saddle has saddle halves connected with each other by at least one connection. Each saddle half has an essentially U-shaped section including side pieces with semicircular recesses to receive a pipe, hose or the like. At least one of the saddle halves has an inwardly bent support part in the vicinity of its recess and extending parallel to the axis of the recess for the support of the pipe, the hose or the like. To configure the support part so that the surface pressure is substantially uniformly distributed between the support part and the pipe, hose or the like clamped in the pipe saddle, the support surface of the support part is considerably longer in its section adjacent to the base part of the U-shaped saddle half than its sections remote from the base part. The edge of the support can define the border line of a simple geometric shape.

9 Claims, 4 Drawing Figures

U.S. Patent  Aug. 4, 1987  4,684,086
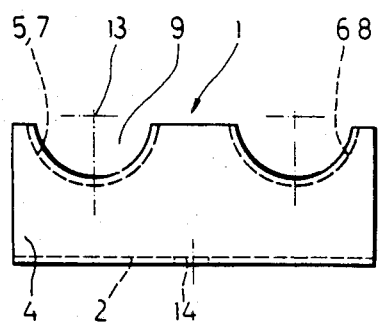
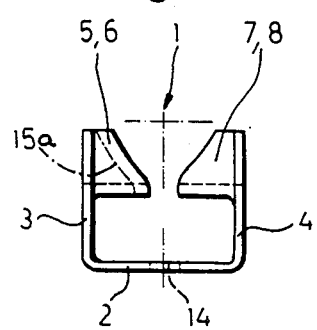
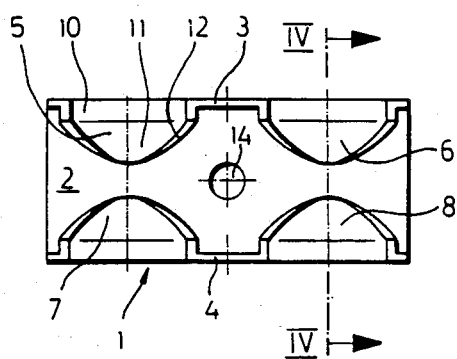
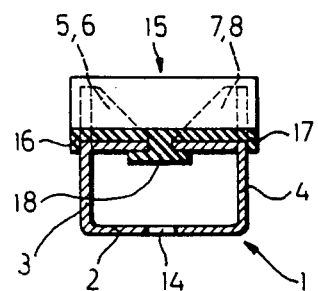

PIPE SADDLE

FIELD OF THE INVENTION

The invention relates to a pipe saddle for supporting tubular objects such as pipes, hoses and the like.

BACKGROUND OF THE INVENTION

In a pipe saddle disclosed in U.S. Pat. No. 3,582,029 to Moesta, the inwardly bent support part is of identical overall axial length about the recess. The axial length corresponds to approximately ¼ to 1/5 of the distance between the two side pieces. With the saddle halves arranged at some spacing from each other, an elastic insert surrounding the pipe, the hose or the like is supported upright in such a manner that the insert middle section, located inside the pipe saddle, is curved outwardly upon tightening such that a tighter insert seat is attained. However, the specific surface pressure is not uniformly distributed.

SUMMARY OF THE INVENTION

An object of the present invention is to provide a pipe saddle which uniformly distributes the specific surface pressure between the saddle half support part and the pipe, hose or the like clamped in the pipe saddle.

Another object of the present invention is to provide a pipe saddle which is simple and inexpensive to manufacture and operate, and is of rugged construction.

The foregoing objects are basically obtained by a pipe saddle comprising upper and lower saddle halves and connection means for releasably coupling the saddle halves. Each saddle half includes an essentially U-shaped cross section with two side pieces connected by a base piece, semi-circular recesses in the side pieces for receiving tubular objects, and at least one support part bent inwardly from one of the side pieces adjacent one of the recesses and extending parallel to the respective recess axis for supporting tubular objects. The support part is considerably longer in a section thereof adjacent the base piece than in a section thereof remote from the base piece. The support part also has an edge in a shape corresponding to a border line of a simple geometric figure.

By securing both saddle halves by at least one connection means, especially screws or bolts, the greatest forces appear in the plane parallel to the connection means and including the axis of the recess. According to the present invention, these forces are applied by an enlarged support part. The lengths of sections of the support part in the axial direction of the semi-circular recess are proportionally smaller the further these sections are located from the cited plane. A uniform distribution of the pressure forces arising between the pipe saddle and the pipe, hose or the like clamped therein, and an improved clamping effect over that of the known pipe saddle are attained thereby.

For the production of the support part, a specially cut out edge of the U-shaped semifinished profile can be used for the support part. A considerably improved material life is also obtained. A multi-angled element of a simple geometric shape, with either outwardly or inwardly bent lines, a circle, a conical section or the like, can be constructed. From the side piece of the pipe saddle out, the support part shape is not wider, but actually is narrower.

A favorable pressure distribution is attained by the shape of the support surfaces on the support parts. The edge of the support part can curve inwardly into the pipe saddle half or form the section of a cone.

The support parts of saddle halves facing each other or adjacent to each other can hold an elastic insert. The insert can be configured as a semicircle or a complete circle in transverse cross section.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIG. 1 is a front elevational view of a pipe saddle according to a first embodiment of the present invention;

FIG. 2 is a side elevational view of the pipe saddle of FIG. 1;

FIG. 3 is a top plan view of the pipe saddle of FIG. 1;

FIG. 4 is a side elevational view in section taken along line IV—IV of FIG. 3 with an elastic insert.

DETAILED DESCRIPTION OF THE PREFERRED EMBODIMENTS

Each saddle half 1, as seen in FIG. 2, has an essentially U-shaped cross-sectional configuration. Side pieces 3 and 4 are arranged on either side of a middle or base piece 2. Side pieces 3 and 4 have two inwardly extending flanges forming support parts 5 to 8 adjacent recesses 9 on each of their free ends. The walls of middle piece 2, side pieces 3 and 4, and support parts 5 to 8 are all of identical thickness, are unitary, and together limit recesses 9 which are essentially semicircular.

Since support parts 5 to 8 are all identical, the description of support 5 will also apply to parts 6 to 8. In the vicinity of side pieces 3, support part 5 has a wall part 10 which, in FIG. 1, is essentially semicircular. Wall part 10 projects inwardly along the entire periphery of recess 9 (FIG. 2). A wall part 11 is attached to wall part 10 toward the inside of saddle half 1. The edge 12 of wall part 11 relative to axis 13 of recess 9 preferably defines a conical section, which tapers from the supporting side piece 3 of the saddle half toward the middle.

Two identically structured saddle halves 1 are arranged one over the other and facing each other such that recesses 9 receive a pipe, a hose or the like. The pipe, the hose or the like is clamped between the two saddle halves 1 by means of a screw, bolt or the like, which passes through a middle bore 14 in the middle piece 2 of the saddle. Bore 14 forms part of the connection means. The support surface of support part 5 is formed of the surfaces of wall parts 10 and 11 facing toward the pipe, the hose or the like. This support surface is of such dimensions that the specific surface pressure between the support surfaces lying opposite one another of the two saddle halves and the pipe or hose of the like is as nearly identical or uniform as possible.

Support parts 5 and 7 and support parts 6 and 8 could project toward the middle of the saddle halves until the parts of each pair almost engage each other.

Wall part 10 can be deleted so that an inward projecting section of support part 5 is present at the top end of a side piece 3 or 4. A corresponding variation is shown by the dotted line 15a in FIG. 2.

Saddle half 1 is preferably produced of a U-shaped profile of sheet steel. Support parts 5 to 8 are flanges extending inwardly and lying on cylindrical surfaces. Support parts 5 to 8 are preferably separated by two to five sheet metal thicknesses from middle piece 2.

The border line of a simple geometric figure or shape defined by edge 12 can also be of the shape of a curve of another type, curved inwardly to the middle of the saddle halves as a conical section. It can also be two sides of an angle or the end line of a triangle attached to a quadrate or a rectangle. The straight lines of the geometric figure can be bent so as to project outwardly or inwardly.

Saddle half 1 can also be provided with only two support parts 5 and 7, facing each other. The bore or bores 14 are then provided on both sides of recess 9.

FIG. 4 shows a saddle half 1 supporting an elastic insert 15. The insert is configured essentially semicircular in transverse cross section. Insert 15 reaches over or extends beyond both support parts 5 to 7 and has edges 16 and 17 engaging side pieces 3 and 4. Between edges 16 and 17, a T-shaped projection 18 is located and fits under support parts 5 and 7. The adjacent edges of support parts 5 and 7 engage splines formed by projection 18. Insert 15 is held in saddle half 1 by projection 18, even when edges 16 and 17 are not present. Instead of a semicircular insert 15, an insert configured as a complete circle can also be used.

While various embodiments have been chosen to illustrate the invention, it will be understood by those skilled in the art that various changes and modifications can be made therein without departing from the scope of the invention as defined in the appended claims.

What is claimed is:

1. A pipe saddle, comprising:
 upper and lower saddle halves, each of said saddle halves including
  an essentially U-shaped cross section with two side pieces connected by a base piece,
  semi-circular recesses in said side pieces for receiving tubular objects, said recesses defining recess axes and having peripheries, and
  at least one partially cylindrical support part bent inwardly from one of said side pieces adjacent one of said recesses, defining at least a portion of the respective recess periphery and extending parallel to the respective recess axis for supporting tubular objects, said support part being considerably longer in sections thereof adjacent said base piece than in sections thereof remote from said base piece, said support part having an edge in a shape corresponding to a border line of a simple geometric figure; and
 connection means for releasably coupling said saddle halves.

2. A pipe saddle according to claim 1 wherein said support parts comprise support surfaces configured such that forces exerted on the lower saddle half are distributed essentially uniformly on the periphery of the tubular object engaged.

3. A pipe saddle according to claim 2 wherein said edge of the support part follows a curve extending inwardly into a middle section of the saddle halves.

4. A pipe saddle according to claim 1 wherein said edge of the support part follows a curve extending inwardly into a middle section of the saddle halves.

5. A pipe saddle according to claim 1 wherein said support part includes an elastic insert, said insert comprising an outwardly projecting T-shaped holder part in a center section thereof, said holder part engaging outside surfaces of two adjacent support parts and meshing the support parts in a spine thereof.

6. A pipe saddle according to claim 4 wherein said support part includes an elastic insert, said insert comprising an outwardly projecting T-shaped holder part in a center section thereof, said holder part engaging outside surfaces of two adjacent support parts and meshing the support parts in a spine thereof.

7. A pipe saddle according to claim 3 wherein said support part includes an elastic insert, said insert comprising an outwardly projecting T-shaped holder part in a center section thereof, said holder part engaging outside surfaces to two adjacent support parts and meshing the support parts in a spine thereof.

8. A pipe saddle according to claim 2 wherein said support part includes an elastic insert, said insert comprising an outwardly projecting T-shaped holder part in a center section thereof, said holder part engaging outside surfaces of two adjacent support parts and meshing the support parts in a spine thereof.

9. A pipe saddle, comprising:
 upper and lower saddle halves, each of said saddle halves including
  an essentially U-shaped cross section with two side pieces connected by a base piece,
  semi-circular recesses in said side pieces for receiving tubular objects, said recesses defining recess axes, and
  at least one support part bent inwardly from one of said side pieces adjacent one of said recesses and extending parallel to the respective recess axis for supporting tubular objects, said support part being considerably longer in a section thereof adjacent said base piece than in sections thereof remote from said base piece, said support part having an edge in a shape corresponding to a border line of a simple geometric figure, said support part including an elastic insert, said insert having an outwardly projecting T-shaped holder part in a center section thereof, said holder part engaging outside surfaces of two adjacent support parts and meshing the support parts in a spine thereof; and
 connection means for releasably coupling said saddle halves.

* * * * *